United States Patent Office 2,929,786
Patented Mar. 22, 1960

2,929,786
SYNTHETIC LUBRICATING OIL COMPOSITION

David W. Young and Robert L. May, Homewood, Ill., assignors to Sinclair Refining Company, New York, N.Y., a corporation of Maine No Drawing. Application May 18, 1956
Serial No. 585,609
4 Claims. (Cl. 252—56)

This invention relates to novel compositions of matter. More particularly, the invention is concerned with reaction products prepared from dibasic acids or their esters and glycols. The reaction is continued until the products have desired viscosities which make them useful as lubricants and particularly as synthetic lubricant oil additives or blending components. The new products are particularly useful as viscosity improvers and load carrying agents for synthetic lubricants and as intermediates for preparing materials having these properties.

The products of this invention are polyesters and can be prepared by direct esterification of dibasic acids with glycols and by an ester interchange reaction between an ester of the dibasic acid and the glycol. These reactions are continued until the product has a kinematic viscosity from about 15 to 200 centistokes at 210° F. and preferably about 40 to 125 centistokes at 210° F. The products themselves can be employed as lubricants but in particular they are useful as additives or blending components in synthetic lubricant compositions. Preferably, the new reaction products are blended with diester synthetic lubricants prepared from dibasic acids and low molecular weight alcohols. Thus the viscosity of our product might be lowered by the addition of the diester lubricant or our product can be employed to thicken the diester base stock. In the latter blends the reaction product of the present invention will increase the load carrying capacity of the base diester oil and the thickener would generally not be more than about 50 weight percent of the blend, preferably about 20 to 50 weight percent. Usually the amount of the reaction product employed in any blend would be at least about 5 percent and advantageously the final lubricating oil composition would have a maximum viscosity at —40° F. of about 13,000 centistokes and a minimum viscosity of about 7.5 centistokes at 210° F.

The dibasic acid employed in preparing the reaction products of this invention will in general contain from about 2 to 28 carbon atoms. Suitable acids are described in U.S. Patent No. 2,575,195 and include the aliphatic dibasic acids of branched and straight chain structures which are saturated or unsaturated. The preferred acids are the saturated aliphatic dibasic acids containing not more than about 12 carbon atoms. Such acids include succinic, adipic, suberic, azelaic, sebacic, and "isosebacic" acids which are mixtures of α-ethyl suberic acid, α,α'-diethyl adipic acid and sebacic acid. Others of the dibasic acids include brassic, brassylic, pentadecanedicarboxylic acid, tetraeicosanedicarboxylic acid, $C_4$ to $C_{24}$ alkenylsuccinic acids, diglycolic acid, and thiodiglycolic acid.

When our reaction products are made by an ester interchange reaction, we employ the esters of the above described dibasic acids. The esters used are those of the acids and the lower aliphatic alcohols so that the alcohol produced in the reaction will be volatilized under the reaction conditions. Generally, the alcohol group of the ester contains up to about 5 carbon atoms and preferably from about 1 to 3 carbon atoms. Suitable esters include methyl sebacate, ethyl adipate, propyl azelate, isopropyl succinate, butyl sebacate, pentyl succinate, methyl brassylate, and similar esters of the other dibasic acids.

In preparing the reaction products of the present invention 1 mole of acid or its ester is reacted with about 0.7 to 1.5 moles of glycol, and preferably this ratio is about 1 to 1. The useful glycols include the aliphatic monoglycols of 3 to 12 carbon atoms, preferably 3 to 6 carbon atoms; and the polyglycols thereof having from about 1 to 50 ether oxygen atoms. Advantageously, the polyglycols contain from about 1 to 6 ether oxygen atoms. The preferred polyglycols are the polypropylene glycols and particularly useful ones of these have molecular weights from about 150 to 450. Others of the glycols are proplyene glycol, butylene glycol, polybutylene glycols, decamethylene glycols and octylene glycols. Preferably, the glycol hydroxy radicals are primary or terminal but they can be otherwise placed in the molecule. Also, the glycols may contain thioether linkages and can be straight or branched chain, for instance, as in 2-ethyl-1,3-hexanediol, 2-methyl-1,3-pentanediol, 2-propyl-1,3-heptanediol and 2-butyl-1,3-butanediol. Minor amounts of other glycols or other materials can be present as long as the desired properties of the product are not unduly deleteriously affected, e.g. its solubility in the synthetic oil base should not be destroyed.

When the esterification reaction is conducted between a dibasic acid and the glycol it is continued with concomitant boiling-off of water from the reaction mixture until the product has the desired viscosity. The temperature of this reaction is usually at least about 300° F. and should not be so high as to decompose the wanted product. If desired, the reaction can be conducted in the presence of a solvent, for instance an aromatic hydrocarbon such as xylene, and to provide a better reaction rate we prefer to employ an acid esterification catalyst. Many of these catalysts are known and include, for instance hydrochloric acid, sulfuric acid, aliphatic and aromatic sulfonic acids, phosphoric acid, perchloric acid, hydrobromic acid, hydrofluoric acid and dihydroxyfluoboric acid. Other catalysts are thionyl chloride, boron trifluoride, silicon tetrafluoride, the chlorides of magnesium, aluminum, iron, zinc, copper and tin and salts of mercury, silver, cobalt, nickel and cerium. In the preferred reaction, when employing the dibasic acid, we use about 0.1 to 0.5 weight percent of paratoluene sulfonic acid catalyst, a xylene solvent and a temperature of about 345 to 390° F. while boiling-off water by refluxing.

When employing the esterification or ester interchange alcoholysis reaction between the dibasic acid ester and the glycol, we prefer not to use a solvent and the temperature is generally above 350° F., but not so high as to decompose the wanted product. Advantageously, the temperature is in the range of about 435 to 480° F. Many ester exchange catalysts are known and include for instance zinc stearate, aluminum stearate, dibutyltin oxide, titanium tetraesters of lower aliphatic alcohols, sodium acid sulfate, sulfuric, hydrochloric and sulfonic acids, aluminum alkoxides, sodium methyl carbonate. Also, these catalysts are exemplified by the alkali metal and alkaline earth metal alkoxides, hydroxides and carbonates.

Our new reaction products can be blended with various synthetic oils of lubricating viscosity, for instance ranging from the light to heavy oils having viscosities of about 35 SUS at 210° F. to 250 SUS at 210° F., and preferably about 35 to 150 SUS at 210° F. Included among the synthetic lubricants are, for example, the polyalkylene glycols prepared from alcohols and alkylene oxides. A number of these oils are available as Ucons prepared from aliphatic alcohols and propylene oxide and having molecular weights of about 400 to about 3000. Related lubricants are the higher molecular weight alkylene oxides, polycarbonates, acryloid polymers, formals, polyformals, polyglycidyl ethers and other ethers.

Widely employed synthetic lubricating oils are the ester types, for instance the mono- and diesters. The esters are made from alcohols and either mono- or polycarboxylic acids. Among the dicarboxylic acids employed are those of up to about 12 carbon atoms, particularly the aliphatic acids such as adipic, azelaic, suberic, alkenylsuccinic, sebacic, etc. Preferred monocarboxylic acids are those of 8 to 24 carbon atoms such as stearic, lauric, etc. The alcohols employed usually contain up to about 20 carbon atoms, preferably up to about 12 carbon atoms, and are generally aliphatic, such as the butyl, hexyl, 2-ethylhexyl, dodecyl alcohols. The alcohols can also be polyfunctional materials, such as glycols, and included among the glycols are the ether glycols. Various ester base oils are disclosed in United States Patents Nos. 2,499,983, 2,499,984, 2,575,195, 2,575,196, 2,703,811, 2,705,724 and 2,723,286. Generally, the synthetic base oils consist essentially of carbon, hydrogen and oxygen, i.e., the essential nuclear chemical structure if formed by these elements alone. However, these oils may be substituted with other elements such as halogens, e.g. chlorine and fluorine.

Among other specific synthetic oils falling within the above classes are ethyl palmitate, ethyl stearate, di-(2-ethylhexyl) sebacate, ethylene glycol di-laurate, di-(2-ethylhexyl) phthalate, 1-naphthyl cetyl ether, di-cetyl ether, polypropylene glycol (and mono- and diethers) (molecular weight 600), di-(1,3-dimethyl butyl) adipate, di-(2-ethyl butyl) adipate, di-(1-ethyl propyl) adipate, diethyl oxalate, glycerol tri-n-octoate, di-cyclohexyl adipate, di(undecyl) sebacate, tetraethylene glycol-di-(2-ethylene hexoate), di-cellosolve phthalate, butyl phthalate, butyl phthallyl butyl glycolate, di-n-hexyl fumarate polymer, dibenzyl sebacate, diethylene glycol bis(2-n-butoxy ethyl carbonate) and oxo process alcohols such as iso-octyl, isodecyl and isotridecyl alcohols made from branched chain propylene polymers.

When desired our reaction product polyesters themselves or their blends including another lubricating oil can contain additives or components to impart wanted characteristics to the compositions. For instance, antioxidants, extreme pressure or load carrying agents, anti-foaming agents, corrosion inhibitors, etc., can be added.

The following specific examples will serve to illustrate the products of the present invention but they are not to be considered limiting.

EXAMPLE I 1,212 grams of sebacic acid, 900 grams of polypropylene glycol 150 average molecular weight, 700 grams of xylene, and 11 grams of p-toluenesulfonic acid were placed in a 5 liter three-necked flask fitted with a thermometer, heating mantle, glass stirrer, reflux condenser, and water-trap. This mass was stirred and heated to reflux, 230° F. Water came over at once. Refluxing was continued for 7 hours as 210 cc. of water was collected. The final reflux temperature was 315° F. The mass which was our new reaction product dissolved in xylene solvent was then cooled to room temperature. The product was further modified by first adding 211 grams (10%) of 2-ethyl hexanol. The mixture was stirred and heated to reflux, 315° F. Water came off at once again. Refluxing was continued for 5 hours as 9 cc. of water was collected. The final reflux temperature was 325° F. The reaction was stopped and the total water collected was 219 cc. The resulting product was then topped to 400° F. at 2–5 mm. Hg to remove xylene. The topped ester and 10% of propylene oxide were placed in a 1 liter stirred autoclave, and stirred and heated to 400° F. It was held at this temperature for 4 hours. The maximum gauge pressure was 110 pounds. The mass was then taken from the bomb and stirred and heated at 356° F. in an open beaker for 15 minutes to flash off the excess propylene oxide and other volatile matter. The liquid product was then filtered and had an acid number, ASTM-D 974, of 0.2 and a K.V. at 210° F. of 72.12 cs.

EXAMPLE II 607 grams of sebacic acid, 1,275 grams of polypropylene glycol 425 average molecular weight, 700 ml. of xylene, and 3.76 grams of p-toluenesulfonic acid were placed in the same equipment as used in Example I. This mixture was heated and stirred at reflux (320–365° F.) for 24 hours. Water collection was essentially nil after this time and our new product was in solution in the xylene. The product was further modified by adding 188 grams of 2-ethyl hexanol and the mass was stirred and heated at 356° F. for 12 hours during which time a little more water came off. The product was topped to 400° F. at 2 to 5 mm. Hg to remove xylene. The resulting liquid polyester was then filtered and the acid number, ASTM-D 974, was 6.47. The product had an actual pour point of −44° F. and viscosities of 344.3 cs., K.V. at 100° F. and 41.4 cs., K.V. at 210° F.

EXAMPLE III 226 grams of azelaic acid, 2,430 grams of polypropylene glycol 2025 average molecular weight, 900 grams of xylene, and 14 grams of p-toluenesulfonic acid were placed in the same equipment as used in Example I. This mixture was stirred and heated to reflux, 340° F. Water came over at once. Refluxing was continued for 6 hours as 47 cc. of water was collected. The final reflux temperature was 345° F. The mass which was our new reaction product dissolved in xylene was then cooled to room temperature. The product was further modified by first adding 266 grams (10%) of 2-ethyl hexanol. The mixture was stirred and heated to reflux, 345° F. Water came off at once again. Refluxing was continued for 7 hours as 6 cc. of water was collected. The final reflux temperature was 345° F. The reaction was stopped and the total water collected was 53 cc. The resulting product was then topped to 400° F. at 2–5 mm. Hg to remove xylene. The topped ester and 10% of propylene oxide were placed in a 1 liter stirred autoclave, and stirred and heated to 400° F. It was held at this temperature for 4 hours. The maximum gauge pressure was 100 pounds. The mass was then taken from the bomb and stirred and heated at 356° F. in an open beaker for 15 minutes to flash off the excess propylene oxide and other volatile matter. The liquid product was then filtered and had a K.V. at 210° F. of 36.80 cs.

EXAMPLE IV 565 g. of azelaic acid, 1,275 g. of polypropylene glycol 425 average molecular weight, 500 g. of xylene, and 1 g. of p-toluenesulfonic acid were placed in the same equipment as used in Example I. This mixture was heated and stirred at 356° F. (reflux) for 24 hours. Water collection was essentially nil after this time. The product was then topped to 400° F. at 2–5 mm. Hg to remove xylene. The liquid material was our new reaction product and it had an acid number of 13.88 and a viscosity at 210° F. of 23.00 cs. This material was recharged to the equipment and 500 ml. of xylene was added. 10% (on the weight of polyester) of 2-ethyl hexanol was also added. This mass was then stirred and heated at 356° F. for 12 hours and more water was collected. The product was topped to 400° F. at 2–5 mm. Hg to remove xylene and the liquid was filtered.

Inspections on our new reaction product were:

K.V. at 100° F_____cs__ 182.4
K.V. at 210° F_____cs__ 23.45
Actual pour, ° F_____ −64
Acid No., ASTM-D 974_____ 8.59

To provide a lubricating oil blend, 350 g. of the reaction product is blended with 650 g. of Plexol 201, a di-2-ethylhexyl sebacate synthetic lubricant. The reaction product was treated with propylene oxide and isolated as in Example III. The acid number of the final liquid product was 0.0 and it had a K.V. at 210° F. of 23.40 cs.

EXAMPLE V 321 g. of adipic acid, 2,255 g. of polypropylene glycol 1025 average molecular weight, 700 g. of xylene, and 13 g. of p-toluenesulfonic acid were placed in the same equipment as used in Example I. The mixture was stirred and heated to reflux, 290° F. Water came off at once. Refluxing was continued for 7 hours as 83 cc. of water was removed. The final reflux temperature was 324° F. The mass which was our new reaction product dissolved in xylene was cooled to room temperature. The product was further modified by first adding 258 g. (10%) of 2-ethyl hexanol. The mixture was then stirred and heated to reflux, 326° F. Water came over again at once. Refluxing was continued for 7 hours as 6 cc. of water was collected. The final reflux temperature was 339° F. The reaction was stopped and the total water collected was 89 cc. The resulting product was topped to 400° F. at 2-5 mm. Hg to remove xylene. 1,354 g. of the topped ester and 135 g. (10%) of propylene oxide were charged to a 2 liter stirred autoclave. The mixture was heated to 400° F. and held there for 3 hours. The maximum guage pressure was 50 lbs. The product was next removed from the bomb and stirred at 356° F. in an open beaker for 15 minutes to flash off the excess propylene oxide and other volatile matter. The liquid product had a K.V. at 210° F. of 27.59 cs.

EXAMPLE VI 454 g. of 1,3-pentanediol, 620 g. of sebacic acid, 500 g. of xylene, and 3 g. of p-toluenesulfonic acid were charged in the same equipment as used in Example I. The mass was stirred and heated to 320 to 356° F. and held there for 24 hours. Water boil-off was approximately zero after this time. The product was filtered and topped to 400° F. at 5 mm. Hg to remove xylene. Laboratory inspections on our new reaction product were:

K.V. at 100° F _____ cs__ 150.3
K.V. at 210° F _____ cs__ 19.12
Actual pour, ° F _____ —62
Acid No. ASTM-D 974 _____ 28.27

To provide a lubricating oil blend, 250 g. of the reaction product is blended with 750 g. of di-(isooctyl) azelate. The product was then charged to a 1 liter stirred autoclave. 18% by weight of propylene oxide was added. The mass was stirred and heated at 400° F. for 6 hours with a maximum guage pressure of 110 lbs. The product was removed, filtered and analyzed:

K.V. at 100° F _____ cs__ 148.85
K.V. at 210° F _____ cs__ 19.00
Actual pour, ° F _____ —62
Acid No. ASTM-D 974 _____ 0.143

A lubricating oil blend can be provided by adding 200 g. of this product to 800 g. of Plexol 201.

EXAMPLE VII 1,000 g. of redistilled dimethyl sebacate, 1,850 g. of polypropylene glycol 425 average molecular weight, and 1.4 g. of Paranox 441 (2,6-di-tertiary-butyl-p-cresol oxidation inhibitor) were charged to a 5 liter flask fitted with a glass stirrer, heating mantle, thermometer, reflux condenser and trap. The system was flushed with nitrogen and the reaction was carried out under a nitrogen atmosphere. The reagents were heated to 342° F. and 4 g. of tetraisopropyl titanate were added rapidly below the surface of the reactants. The mass was then heated at above 355° F. and at atmospheric pressure for 3 hours. The maximum temperature was 453° F. The product was then heated at 6.5 mm. Hg at temperatures up to 388° F. until no more alcohol make was observed. The liquid product was filtered and had a K.V. at 210° F. of 101.7 cs.

EXAMPLE VIII 1,000 g. of n-dibutyl sebacate, 1,360 g. of polypropylene glycol 425 average molecular weight, and 23.6 g. of tetraisopropyl titanate were charged to the same equipment as in Example VII. The mass was heated to 235 to 245° C. and kept there for 2¾ hours. Oxygen-free nitrogen was added at a 2 cu. ft./hr. rate to help remove the alcohol of reaction. The sample was then filtered and test data were:

K.V. at 100° F _____ cs__ 211.4
K.V. at 210° F _____ cs__ 30.62
Actual pour, ° F _____ —42
Acid No. ASTM-D974 _____ 3.55

The product yield was 98% by weight and this product was our new reaction product. The product was then charged to a 1 liter stirred autoclave. 10% by weight of propylene oxide was added. The mixture was stirred and heated at 400° F. for 4 hours. The liquid product was removed, filtered and analyzed K.V. at 100° F _____ cs__ 207.4
K.V. at 210° F _____ cs__ 29.75
Actual pour, ° F _____ —42
Acid No. ASTM-D974 _____ 0.152

A lubricating oil blend can be provided by adding 450 g. of this product to 550 g. of di-(isooctyl)azelate.

The pertinent data for additional polyester preparations are listed in Table I. The experimental procedure was essentially that of Example VII.

Table I

ESTER PREPARATION BY INTERCHANGE REACTION

| | Examples | | | | |
|---|---|---|---|---|---|
| | IX | X | XI | XII | XIII |
| Reagents: | | | | | |
| Ester | Dimethyl sebacate. | Dimethyl sebacate. | Dimethyl sebacate. | Dimethyl sebacate. | Dimethyl sebacate. |
| Poly Propylene Glycol, average M.W. | 425 | 425 | 150 | 1025 | 2025 |
| Mol. Ratio, Ester/Glycol | 1.0 | 1.0 | 1.0 | 1.0 | 1.0 |
| Paranox 441, wt. percent | | | | | |
| Catalyst 1, wt. percent | .1 | .72 | .18 | .19 | .19 |
| Catalyst 2, wt. percent | | | | | |
| Maximum Reaction Temp., ° C | 245 | 240 | 265 | 250 | 254 |
| Hours above 180° C | 5 | 4.5 | 3.5 | 2.2 | 3.1 |
| Finishing Vacuum, mm. Hg | 5 | 100 | ~5 | 5 | 5 |
| Finishing Temp., ° C | 204 | 200 | 210 | 202 | 200 |
| Product: | | | | | |
| K.V. at 100° F. (cs.) | 358.2 | 633.3 | 876.5 | 879 | 293.7 |
| K.V. at 210° F. (cs.) | 47.32 | 73.72 | 91.12 | 109.86 | 42.95 |
| Acid Number, ASTM-D974 | 1.05 | .73 | .28 | .08 | .21 |
| Actual Pour, ° F | —48 | —40 | —35 | —45 | —45 |

Table I—Continued

| | Examples | | | | |
|---|---|---|---|---|---|
| | XIV | XV | XVI | XVII | XVIII |
| Reagents: | | | | | |
| Ester | Dimethyl sebacate | Di-n-butyl sebacate | Dimethyl sebacate | Dimethyl sebacate | Dimethyl sebacate |
| Poly Propylene Glycol, average M.W. | 425 | 425 | 425 | 425 | 425 |
| Mol. Ratio, Ester/Glycol | 1.0 | 1.0 | 0.8 | 1.25 | 1.0 |
| Paranox 441, wt. percent | .05 | | .05 | .06 | |
| Catalyst 1, wt. percent | | 1.31 | .18 | .193 | 0.829 |
| Catalyst 2, wt. percent | .04 | | | | |
| Maximum Reaction Temp., °C | 250 | 246 | 240 | 233 | 230 |
| Hours Above 180° C | 8 | 7.5 | 2.5 | 1.2 | |
| Finishing Vacuum, mm. Hg | 100 | 7 | 7 | 7 | 5 |
| Finishing Temp., °C | 200 | 232 | 210 | 204 | 200 |
| Product: | | | | | |
| K.V. at 100° F. (cs.) | 242.50 | 1980.7 | 665.3 | 397.6 | 121.7 |
| K.V. at 210° F. (cs.) | 38.59 | 197.38 | 75.40 | 52.66 | 18.4 |
| Acid Number, ASTM-D974 | .74 | .28 | .15 | .16 | |
| Actual Pour, °F | | −24 | −38 | −42 | |

1 Tetraisopropyl titanate.
2 Dibutyl tin oxide.

Typical lubricating oil blends containing the products of a number of the above examples are described in Table II.

Table II
SYNTHETIC OIL BLENDS

| | 1 | 2 | 3 | 4 | 5 | 6 | 7 | 8 | 9 | 10 | 11 |
|---|---|---|---|---|---|---|---|---|---|---|---|
| Composition, Wt. Percent: | | | | | | | | | | | |
| Plexol 201 a | 67.9 | 73.72 | 72.8 | 72.8 | 53.9 | 73.72 | 49.75 | 64 | 55.3 | 76.5 | 73.5 |
| Phenothiazine b | 0.5 | 0.5 | 0.5 | 0.5 | 0.5 | 0.5 | 0.5 | 0.5 | 0.5 | 0.5 | 0.5 |
| Tricresylphosphate c | 2.5 | 2.5 | 2.5 | 2.5 | 5.0 | 2.5 | | 2.5 | 2.5 | | |
| D.C.F. 200-60,000 d | 0.001 | 0.001 | 0.001 | 0.001 | 0.001 | 0.001 | 0.001 | 0.001 | 0.001 | 0.001 | 0.001 |
| Ester Thickener | 29.1 | 23.28 | 24.2 | 24.2 | 40.6 | 23.28 | 49.75 | 33 | 41.7 | 23 | 26 |
| of Example | IX | X | XV | VII | II | I | IV | III | V | XVI | XVII |
| Tests: | | | | | | | | | | | |
| K.V. @ −40° F | 10,005 | 9,044 | 14,204 | 10,896 | 10,000 | 8,211 | 21,305 | 11,272 | 16,742 | 8,007 | 7,515 |
| K.V. @ 100° F | 35.75 | 34.63 | 51.47 | 40.34 | 52.4 | 32.88 | 37.34 | 40.81 | 33.64 | 33.16 | |
| K.V. @ 210° F | 7.694 | 7.596 | 11.03 | 8.808 | 10.08 | 7.126 | 8.469 | 8.096 | 8.471 | 7.490 | 7.837 |
| Pour, °F | below −80 | below −80 | below −80 | below −80 | below −80 | below −80 | below −80 | below −80 | below −80 | below −80 | below −80 |
| Acid Number, ASTM-D974 | 0.28 | 0.11 | 0.20 | 0.03 | 2.72 | 0.12 | 0 | 0.06 | 0.01 | 0.04 | 0.13 |
| Ryder Gear Test, pounds | 4,000-4,170 | 4,020-4,040 | | | | | | | | | | a Di-2-ethylhexyl sebacate oil has a K.V. @ 100° F. of 12.3 cs.; V.I. of 154; acid number of 0.12 and pour below −80° F.
b Anti-oxidant.
c Load-carrying agent.
d Methly silicone polymer having a viscosity of 60,000 at 25° C., anti-foaming agent.

We claim:

1. A synthetic lubricating oil composition having a maximum viscosity at −40° F. of about 13,000 centistokes and a minimum viscosity of about 7.5 centistokes at 210° F. and consisting essentially of an oily diester base having a viscosity of about 35 to 150 SUS at 210° F., said diester being of an aliphatic dibasic acid of up to about 12 carbon atoms and an aliphatic alcohol of up to about 12 carbon atoms, and about 20 to 50 weight percent of the polyester produced by reacting in the mole ratio of about 1:1 sebacic acid and polypropylene glycol having a molecular weight of about 150 to 450, said polyester having a kinematic viscosity of about 40 to 125 centistokes at 210° F.

2. A synthetic lubricating oil composition having a maximum viscosity at −40° F. of about 13,000 centistokes and a minimum viscosity of about 7.5 centistokes at 210° F. and consisting essentially of an oily diester base having a viscosity of about 35 to 250 SUS at 210° F., said diester being of an aliphatic dibasic acid of up to about 12 carbon atoms and an aliphatic alcohol of up to about 12 carbon atoms, and about 20 to 50 weight percent of the polyester produced by reacting in the molar ratio of about 1:1 a material selected from the group consisting of aliphatic dibasic acids of up to about 12 carbon atoms and the lower aliphatic esters thereof containing up to about 3 carbon atoms in the ester group with a material selected from the group consisting of monoglycols of 3 to 6 carbon atoms and polyglycols thereof having up to about 6 ether oxygen atoms, said polyester having a kinematic viscosity of about 40 to 125 centistokes at 210° F.

3. The composition of claim 2 in which the polyester is prepared from sebacic acid and polypropylene glycol having a molecular weight of about 150 to 450.

4. A synthetic lubricating oil composition having a maximum viscosity at −40° F. of about 13,000 centistokes and a minimum viscosity of about 7.5 centistokes at 210° F. and consisting essentially of di-2-ethylhexyl sebacate base oil and about 20 to 50 weight percent of the polyester produced by reacting in the mole ratio of about 1:1 sebacic acid and polypropylene glycol having a molecular weight of about 150 to 450, said polyester having a kinematic viscosity of about 40 to 125 centistokes at 210° F.

References Cited in the file of this patent

UNITED STATES PATENTS

| 2,499,984 | Beavers et al. | Mar. 7, 1950 |
| 2,562,878 | Blair | Aug. 7, 1951 |
| 2,628,974 | Sanderson | Feb. 7, 1953 |
| 2,744,025 | Albus et al. | May 1, 1956 |
| 2,785,194 | Hoare | Mar. 12, 1957 |

FOREIGN PATENTS

| 711,211 | Great Britain | June 30, 1954 |